July 31, 1945. C. LATEINER 2,380,453
CAMERA CONSTRUCTION
Filed April 1, 1941 3 Sheets-Sheet 1
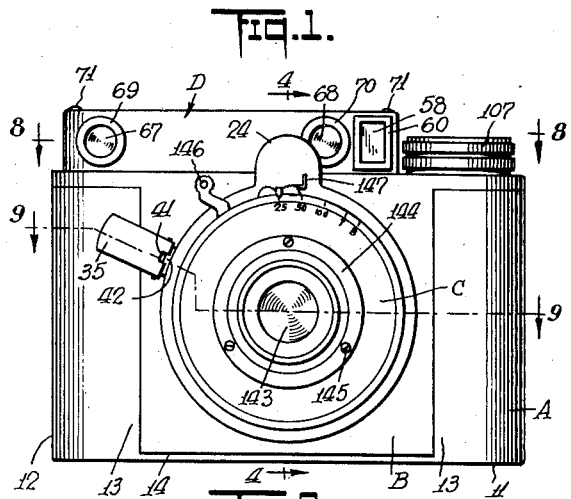
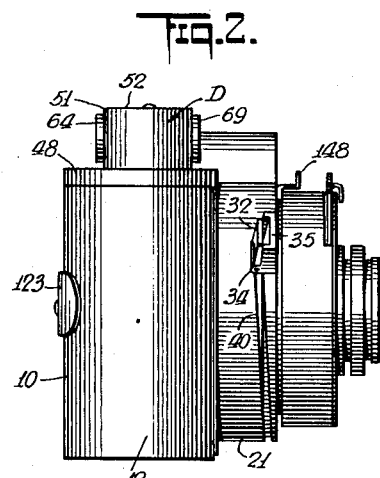
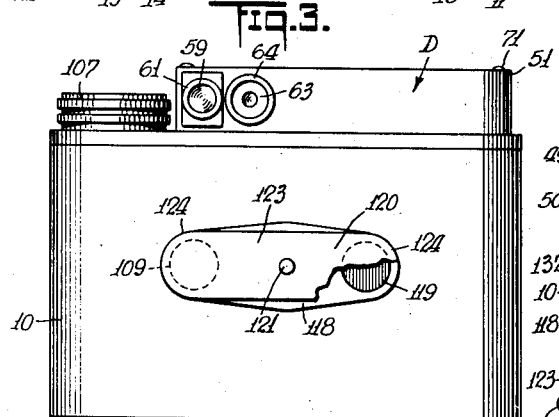
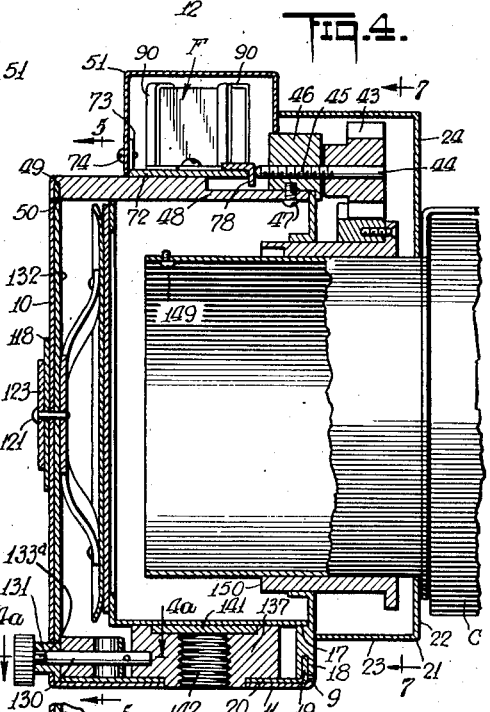
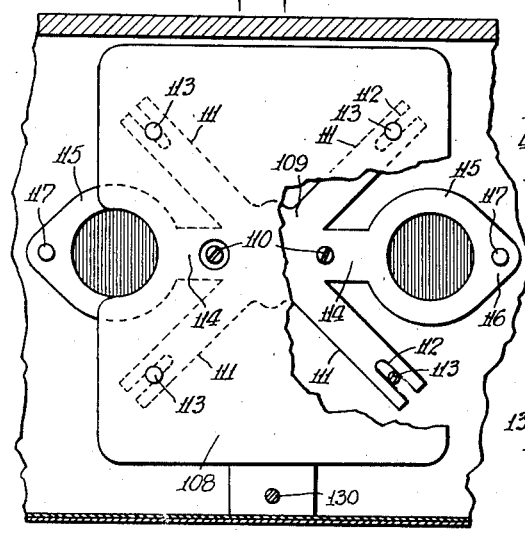
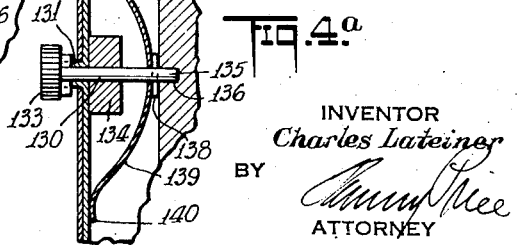
INVENTOR
Charles Lateiner
BY
ATTORNEY

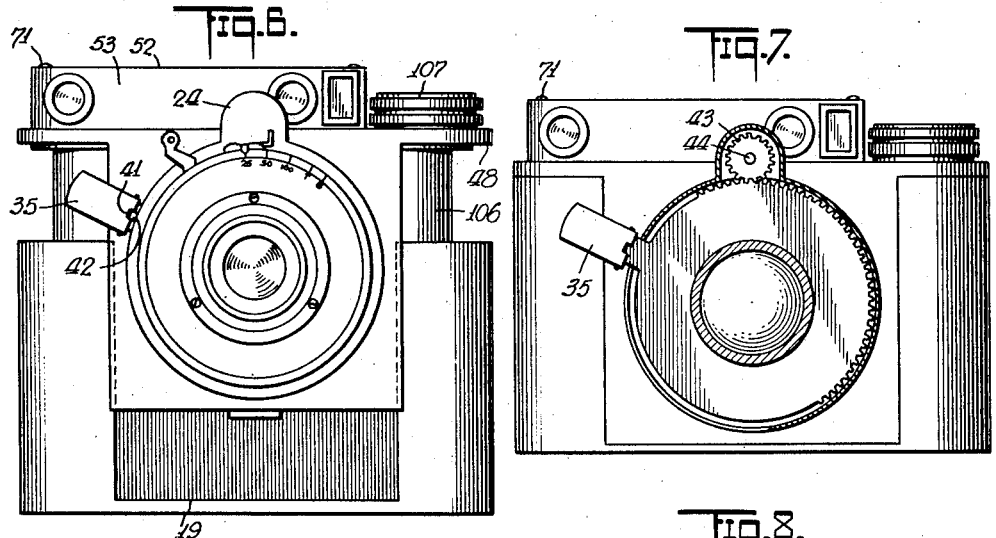
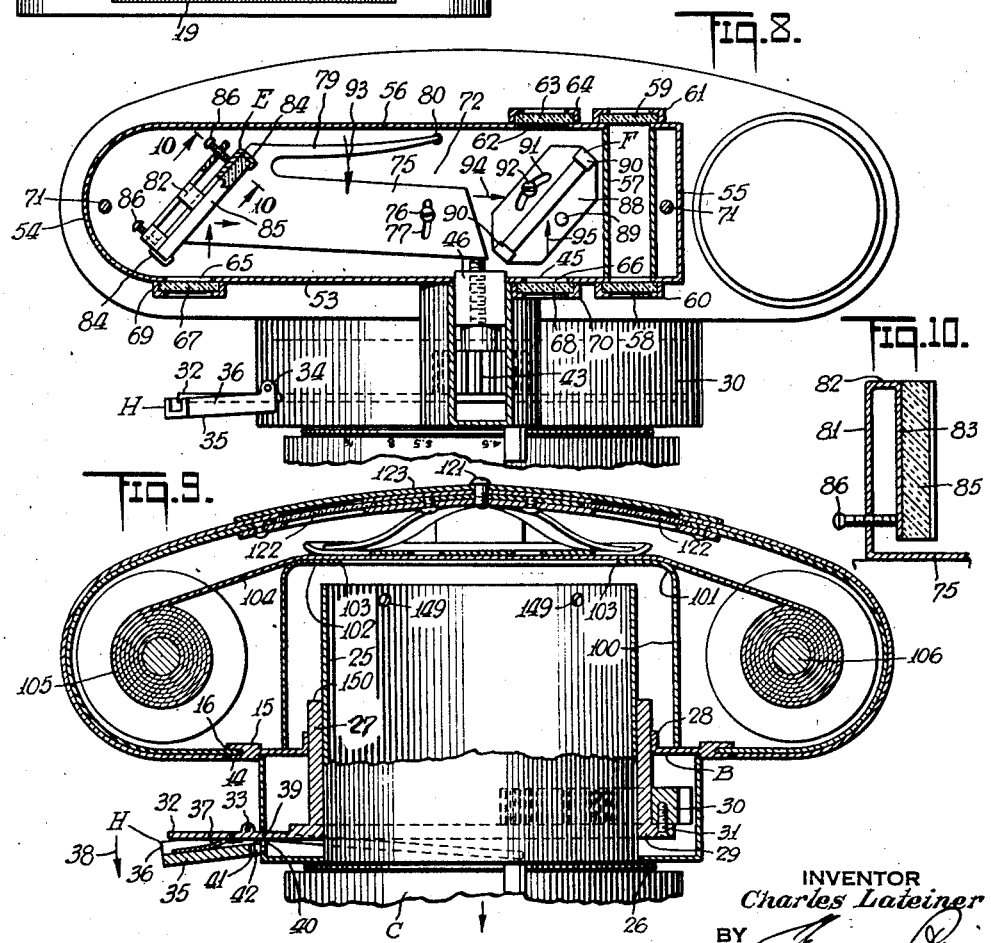

July 31, 1945.  C. LATEINER  2,380,453
CAMERA CONSTRUCTION
Filed April 1, 1941  3 Sheets-Sheet 3
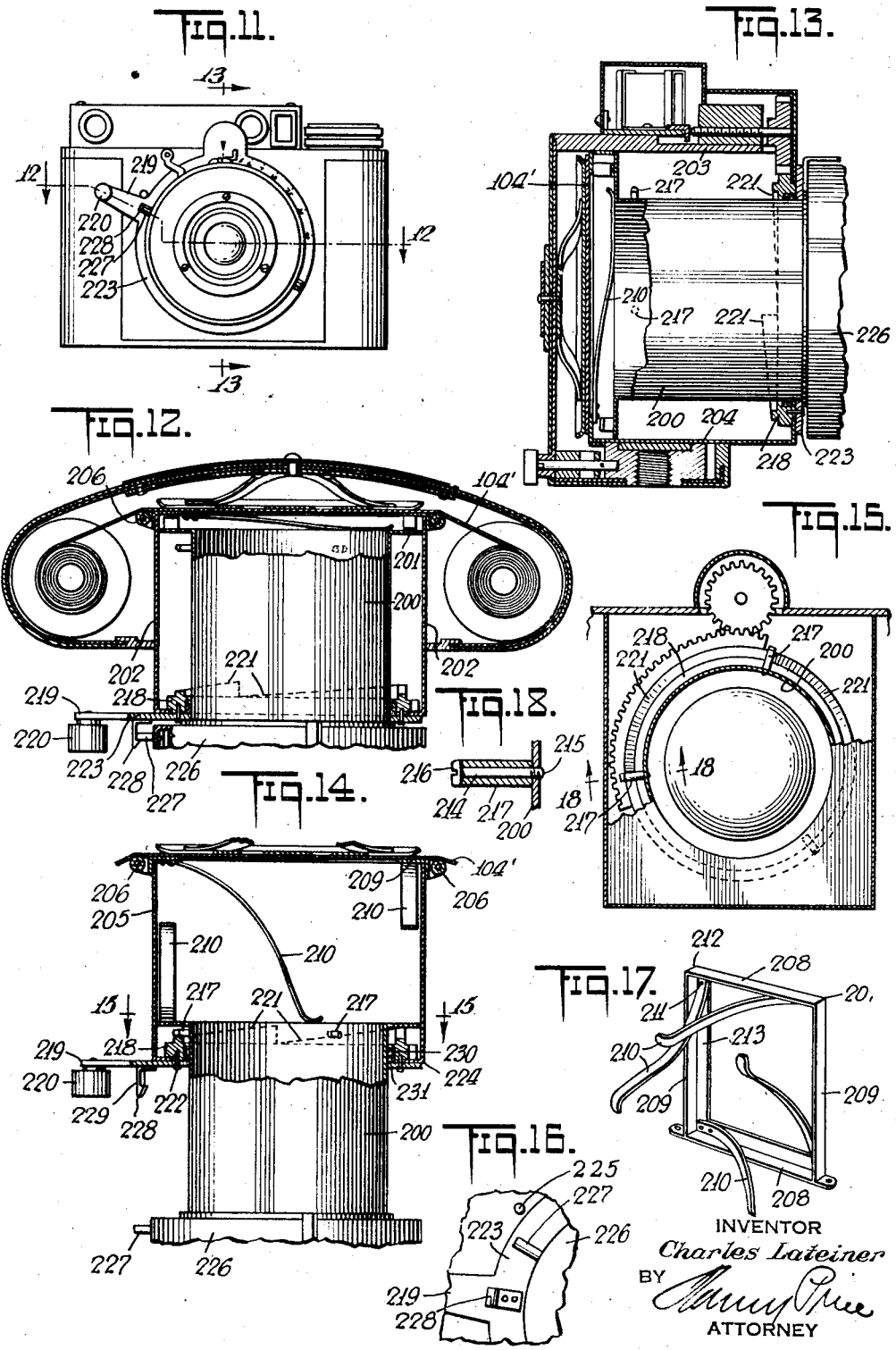
INVENTOR
Charles Lateiner
BY
ATTORNEY Patented July 31, 1945

2,380,453

UNITED STATES PATENT OFFICE 2,380,453

CAMERA CONSTRUCTION

Charles Lateiner, New Rochelle, N. Y., assignor to Elba Trading Corporation, Brooklyn, N. Y., a corporation of New York Application April 1, 1941, Serial No. 386,245

10 Claims. (Cl. 95—44)

The present invention relates to a camera construction and it particularly relates to a small compact inexpensive camera construction including a built-in range finder.

It has not been found customary to provide built-in range finders for most low price camera constructions because of the added expense involved, and it is among the objects of the present invention to provide an improved simplified built-in range finder construction for cameras, which will without unduly increasing the bulk of the camera or its cost, nevertheless enable an accurate determination of the distance of the object to be photographed and focusing of the camera so as to permit taking of accurate sharply defined pictures of such objects.

It is also an object of the present invention to provide a simplified camera construction which may be readily constructed and repaired and which will be made in such a manner as to enable ready insertion of the film to be exposed or removal of such film after exposure.

Still further objects and advantages will appear from the more detailed description set forth below, it being understood, however, that this more detailed description is given by way of illustration, since various changes therein may be made by those skilled in the art without departing from the scope and spirit of the invention.

In accomplishing the above objects it has been found most satisfactory according to one embodiment of the present invention to provide a gear and pinion construction, said gear taking the form of a ring enclosing the lens housing, which gear through said pinion will drive a screw to adjust a carrier for an oblique mirror which cooperates with another oblique transparent mirror.

Either of these mirrors may be initially adjusted to a fixed position and thereafter adjustments may be made by rotation of the gear until the overlapping or split images which are produced by the mirrors coincide, giving the proper focus and setting of the camera in accordance with the distance of the object to be photographed.

It has been found most convenient to mount these small mirrors in a laterally elongated casing at the top of the camera structure with the carrier for one of the mirrors being an elongated thin metal plate having an off-struck leg serving as a resilient member to bias the plate against adjustment by the screw actuated by the gear above described.

It has been found most desirable to provide the range finder and lens construction on one unit and to form the main casing including the back, sides and the bottom of the camera, as another unit, which is designed to be combined with or separated from the lens and range finder construction to enable repair of the camera or insertion or removal of a film.

In the preferred form, the casing has a recessed open front and open top which may be closed by insertion of the range finder-lens unit, which unit is designed to be slid down into position to cover the recessed front and open top of the casing.

The back of the casing is preferably provided with a latch or lock to lock the construction together consisting of a key or latch member extending through the rear of the casing and engaging the lower part of the lens carrier.

The back of the camera casing may be provided with a sheet metal unit having a plurality of arms, two of which may form the frames for the windows through which the positioning of the film may be observed and the others of which may serve to support a presser plate to be pressed against the film and to hold it in position to be exposed.

The back of the camera may be provided with a turning leaf spring element which may be rotated to cover said windows through which the movement of the film may be observed.

Referring to the drawings which illustrate several of the various possible embodiments of the present invention, but to which the present invention is by no means restricted, since the drawings are merely by way of illustration and not by way of limitation, Fig. 1 is a front elevational view of the camera construction, Fig. 2 is an end elevational view, Fig. 3 is a rear elevational view, Fig. 4 is a transverse elevational view upon the line 4—4 of Fig. 1, upon an enlarged scale as compared to Fig. 1, Fig. 4a is a fragmentary transverse sectional view upon the line 4a—4a of Fig. 4, showing the latch or lock to hold the camera structure together, Fig. 5 is a transverse sectional view upon the line 5—5 of Fig. 4 to show the presser plate and the spider support therefor, Fig. 6 is a front elevational view similar to Fig. 1, showing the lens unit partly raised from the casing unit, Fig. 7 is a transverse sectional view upon the line 7—7 of Fig. 4 upon a somewhat smaller scale, showing the detailed drive mechanism of the range finder, Fig. 8 is a transverse sectional view upon the line 8—8 of Fig. 1, upon an enlarged scale as compared to Fig. 1, Fig. 9 is a transverse sectional view upon the line 9—9 of Fig. 1, upon an enlarged scale as compared to Fig. 1, Fig. 10 is a fragmentary transverse sectional view upon the line 10—10 of Fig. 8, showing one of the range finder mirrors upon an enlarged scale as compared to Fig. 8, In the alternative embodiment of Figs. 11 to 17, Fig. 11 is a front elevational view upon a somewhat smaller scale as compared to Fig. 1, Fig. 12 is a sectional view upon the line 12—12 of Fig. 11, similar to, but somewhat smaller than Fig. 9, Fig. 13 is a transverse fragmentary sectional view upon the line 13—13 of Fig. 11, Fig. 14 is a fragmentary sectional view similar to Fig. 12, with the lens carrier in extended position, Fig. 15 is a fragmentary transverse sectional view upon the line 15—15 of Fig. 14, Fig. 16 is a fragmentary elevational view of a portion of the stop pin and catch construction, Fig. 17 is a front perspective view of the spring presser member, and Fig. 18 is an enlarged longitudinal sectional view of a roller pin construction permitting adjustment of the lens carrier to the range at which the picture is to be taken.

Referring to the drawings, the camera construction consists of a casing A, a front plate B, carrying the telescoping lens structure C. The casing D receives the spaced range finder mirrors, as best shown in Fig. 8.

Referring particularly to Figs. 1 to 3 and 6, the casing has the curved rear 10, the bottom 11, the rounded ends or sides 12 and the front 13, which has a tongue at 14.

Received in the tongue 14 is the front plate B, which as shown in Figs. 6 and 9, is provided with the edge portions 15 slotted at 16 to slide onto the side edges of the tongue 14.

The lower edge 17 of the front plate, as shown in Fig. 4, is provided with a slot 18 which receives the upstanding flange 19 turned up from the plate 20 attached to the bottom 11 of the camera. The upturned portion 9 of the bottom 11 will abut the lower edge of the front plate B and act as a stop.

The plate B carries the supplemental front casing 21, which has the front wall 22, the cylindrical wall 23 and the top dome 24 (see particularly Fig. 4).

Referring to Figs. 4 and 9, the lens assembly C is carried by the sleeve 25, which slides through the opening 26 in the plate 22 and also slides in the sleeve 27. The sleeve 27 bears in the sleeve 28 attached to the front wall B.

The sleeve 27 has a flange 29 and is encircled by the ring gear 30 connected to said flange 29 by the screw 31 at three equi-distant positions.

The gear 30 is turned with the plate 29 by the outstanding handle E having the projection 32. The element 32 is provided with a pivot mount at 33 (see Fig. 9) for the ears 34 (see Fig. 2) of the channel-like member 35 having the side plates 36. The leaf spring 37 tends to bias the element 35 in the direction 38 (see Fig. 9).

It will be noted by reference to Figs. 2 and 9 that the element 32 fits at 39 in a slot 40 in the structure 21, which slot inclines forwardly and downwardly as shown in Fig. 2.

In the infinity position shown in Figs. 1 and 2, the handle 32 will be locked against movement.

This latching is accomplished by recessing the plate member 35 at 41 (see Figs. 1, 6 and 9). The recess 41 is designed to receive the head 42 of the small screw which is threaded into the side of the box 21.

When the element 35 is pressed downwardly against the spring 37, the handle 32 may be used to turn the ring gear 30 together with the sleeve 27. This in turn will rotate the pinion 43, which is positioned in the dome 24.

The pinion 43 is mounted on the shaft 44 and drives a screw 45 (see Figs. 4 and 9), which is threaded into the block 46. The block 46 is mounted by the screws 47 on the top plate 48 of the camera structure. This top plate 48 is provided with a peripheral groove 49, which receives the upper edge 50 of inside plate 132 at the back 10 and sides 11 of the casing A.

Attached to the top 48 is the casing 51 for the view observer and the range finder combination D, which is best shown in Fig. 8.

The casing 51 has the top wall 52, the front wall 53, the curved side wall 54 and the rear wall 55.

As shown particularly in Fig. 8, there is provided a tube 57 having the front and rear lenses or glasses 58 and 59, which are held by the frame rings 60 and 61. Through the glasses 58 and 59 and the tube 57 the picture to be taken may be observed.

The back face 56 is also provided with the window 62 covered by the glass 63, the edge of which is held by the ring 64 through which the operation of the range finder may be observed and controlled.

The front plate 53 is provided with windows 65 and 66, which are covered by the glasses 67 and 68, the edges of which are held down by the rings 69 and 70.

The windows 62, 65 and 66 are arranged to cooperate with the range finding mirrors E, which is movable, and F, which is designed to be fixed in an initially adjusted position.

The block 46 also projects through and fits in an opening in the front wall 53 of the casing 51.

The screws 71 (see Figs. 1, 2, 6 and 7) pass through the outside portions of the box 56 and through the base plate 72 of the casing 51. The plate 72 has the upturned ears 73 which are attached by the screws 74 to the side walls of the casing 51 (see Fig. 4).

The elongated plate 75 which serves as a carrier for the mirror construction E is mounted upon said plate 72 by the screw 76, which rides in the slot 77.

This plate 75 has a downturned flange 78 (see Fig. 4) which abuts the end of the screw 45 and which is pressed against said screw by the resilient tongue 79 (see Fig. 8), the end of which is turned downwardly at 80 into an opening or recess in the plate 72.

The plate or elongated arm 75 is provided with the upstanding flange 81, which is turned over at 82 and has a reversely extending portion 83 (see Fig. 10), which has side inturned portions 84 (see Fig. 8) to receive the mirror 85.

The mirror 85 receives light through the window 67 and it may be adjusted by the screws 86. This adjustment enables a correction of the vertical inclination of the mirror E so as to properly direct the light which is received through the window 67 and which is reflected as indicated by the arrows 87. The light reflected by the arrows 87 will strike the transparent mirror structure F.

This mirror F is held on a base plate 88, which is pivotally mounted at 89 on the plate 72. The mirror F is held by the side frame elements 90.

The side of the base 88 opposite the pivot mount 89 is provided with an arcuate slot 91 receiving the screw 92 which enables adjustment of the angular position of the mirror.

The adjustment 92, together with the adjustments 86, permit adjustment of the horizontal and vertical inclination of the mirror structures E and F so that they will properly transmit and reflect light received from the object to be photographed through the windows 67 and 68 to the rear window 63 and to the eye so that the focusing of the image may be most conveniently performed.

After initial setting of the arrangement as shown, turning of the handle 32 after unlatching the same upon pressing down the element 35, will move the mirror structure E relatively to the mirror structure F against the spring element 79 until the proper adjustment or coincidence of the images takes place, as appears to an observer through the window 63.

The spring 79 normally tends to press the mirror E in the direction indicated by the arrow 93 (see Fig. 8).

By making the mirror construction F partly transparent, the views of the object to be photographed indicated by the arrows 94 and 95 in Fig. 9 will be superimposed. By making the mirrors E and F, so that each will only transmit half of the image, a split image effect will be obtained.

This range finding arrangement which may be integrally incorporated into the camera housing, as indicated particularly in Figs. 4 and 8, is substantially entirely constructed of sheet metal elements, with a minimum of machine parts and although inexpensive and durable, is nevertheless accurate.

The front plate B also carries a box 100, which has the curved back portions 101 and the back plate 102, with the window or opening 103 through which the film is exposed (see Figs. 4 and 9).

The film 104 passes over said plate 102 in passing from the spool 105 to the spool 106, which spools are supported from the top plate 48. The spool 106 may be turned by the knob 107, which is positioned above the top plate 48.

The presser plate 108, which is best shown in Fig. 5, is supported and pressed forwardly by the spider member 109, which is screwed at 110 to the back 10 of the camera casing A.

The arms 111 of said spider 109 are provided with slotted end portions 112 in which are received the slide screws 113.

The pressure upon the pressure plate 108 will result in outward movement of the arms 111, whereas release of the pressure plate 108 will permit said arms to move inward and press said plate 108 forwardly.

The spider 109 is also provided with the arms 114, which terminate in the window frame members 115 having the ears 116 which are rivetted or screwed at 117 to the curved back 10 of the casing A.

The frames 115 cooperate with the elongated element 118, which is provided with the frame members 119 and carries the swinging cover member 120 by the screw or pivot 121.

Between the frame members 119 and 115 and in openings of the rear wall 10 of the casing A are held the red colored transparent windows 122, which may be covered or uncovered by rotating the swinging member 120 from the position shown in Fig. 3.

As arranged, the intermediate portion of the elongated member 120 is bulged at 123 from the back 10 of the camera casing A and has pressed down portions 124 which cover the windows 122.

The presser plate 108 and the spider 109, as shown in Figs. 4, 5 and 9, may be readily stamped out of sheet metal and this greatly simplifies and decreases the cost of construction of the camera.

The latch construction is best shown in the bottom of Fig. 4 and in Fig. 4a. This latch construction is provided with a sliding pin-like member 130, which slides in the sleeve 131 turned outwardly from the inner double wall 132. Said sleeve 131 projects through the back double wall 10.

The head of the pin is enlarged and knurled, as indicated at 133 and has the side fins 133a. The pin 130 extends through a block 134, which is mounted on said inner wall 132 adjacent the bottom of the casing A.

The end 135 of the pin 130 is designed to fit in the opening 136 in the block 137 to hold the assemblage together.

The pin 130 receives the bar 138 which contacts with the leaf spring 139 having the foot members 140 pressing against said inside wall 132.

When the pin 130 is withdrawn and turned the fins 133a contacting the outer edge of the sleeve 131 will keep it in withdrawn position.

The block member 137 is provided with the recess receiving the insert 141 and also with a tapped opening 142 upon which the entire camera construction may be mounted.

The lens structure, as shown best in Figs. 1, 2 and 6, has the glass lens arrangement 143 with the carrying ring 144 held in position by the screws 145. The lens is provided with the shutter lever 146 and with the exposure adjustment lever 147.

The lever 148 enables adjustment of the opening of the iris. The lens when used is normally designed to be pulled out until the stop screws 149 on the cylinder 25 contact the end 150 of the barrel 27.

Then by releasing the latch 41—42 upon pressing down the element 35 against the arm 32, the lens may be adjusted so that the object to be photographed will be in focus.

The area to be photographed will be observed through the windows 58 and 59 in the tube 57, whereas the superimposed or split images may be observed through the window 63. During the adjustment of the handle 32, the movement of which handle will be transmitted through the gear 30 and the pinion 43 to the screw 45 moving the plate 75 together with its mirror E until the images are superimposed or coincide, as observed through the window 63.

The lever 147 will have been previously set for the proper exposure and the lever 148 for the proper opening and then the shutter may be opened by the lever 146. The film may be readily turned by the knob 107 and its movement may be observed through the windows 122.

To remove or insert the film, the pin 130 may be withdrawn and the casing A removed from the front plate B. After the film has been removed and/or replaced, the casing A may again be assembled with the front plate B, with the engaging of the fins or edges of the casing A namely as indicated at 19 and 50 in Fig. 4 and 16 in Fig. 9, with the channels 14, 18 and 49 (see also Figs.

4 and 9), forming a complete light-tight connection.

The method in which the elements are assembled together is well indicated in Fig. 6 and when the assembly is complete, the locking pin 130 will snap into the opening or recess 136 in the block 137.

The plate 108 will press the film to be exposed against the back of the chamber 100 and against the plate 102 around the opening 103.

In the alternative construction shown in Figs. 11 to 17, similarly functioning parts are indicated by the same numerals as designated in Figs. 1 to 10, however primed.

In Figs. 11 to 14, the tubular member 200 has an outstanding flange 201, which extends outwardly to contact the side walls 202 and the top and bottom walls 203 and 204 of the enclosure 205. The enclosure 205 carries roller members 206, over which the film 104' moves and the frame in back of the enclosure 205 is formed by the member 207 having the top and bottom members 208 of L shaped cross section and the side members 209.

The outstanding spring fingers 210 are attached by the rivets 211 adjacent the corners 212 upon the inside flanges 213 of the frame and they press against the flange 201 at the back of the tube 200 and tend to project it from the position shown in Fig. 12 to the position shown in Fig. 14.

The tubular member 200 also carries the rollers, best shown in Figs. 15 and 18, which consist of set screws 214 having threaded end portions 215 to be screwed into the tube 200. Each screw 214 has an enlarged head 216 which holds the roller 217 in position on the shank 214.

The ring 218 which turns with the lever 219 having the handle 220 has a series of oblique shoulders 221, which contact the rollers 217 when the tube 200 is in extended position, as shown in Fig. 14.

The ring 218 is riveted, as indicated at 222 to the plate 223, which is integral with the lever 219, said plate turning in front of the plate 224 of the box member 214 and said ring 218 being positioned in back of said inturned flange 224.

It will be noted by reference to Fig. 16 that the arm 219 is stopped by contact with the stop pin 225.

On the rotating lens carrier structure 226, there is provided an outwardly extending pin 227 which is designed to be received in the projecting portion 228 of the catch 229 to hold the tube 200 in retracted position, as indicated in Fig. 12. As soon as the pin 227, however, is turned away from the overhanging portion 228 of the catch 229, the tube 220 will snap out into the position as shown in Fig. 14 under the influence of the spring fingers 210.

It will be noted that the ring 218 is provided with a recess 230, which receives a gasket 231 to seal the interior of the camera against leakage of light.

The other elements in the embodiment of Figs. 11 to 18 are substantially the same character and construction as already described in connection with Figs. 1 to 10 and it is not necessary again to describe them.

It will be noted that according to the embodiments of Figs. 11 to 18, the adjustment of the lens to the distance of the object to be photographed will be effected by slight backward and forward movement of the tubes 200 as the rollers 217 ride over the oblique cam faces 221 carried by the ring 218.

This adjustment will be effected together with adjustment of the range finder construction positioned at the top of the camera, as already described in connection with Figs. 1 to 10.

It will also be noted that the tubular member 200 may be readily snapped out into extended position, as shown in Fig. 14, when the pin 227 is released from the catch 228.

It is to be understood that many alternative and varying constructions may be made pursuant to the broad aspects of the present invention, as above pointed out, and it is intended to cover and include all such alternatives and variations as come within the scope of the appended claims.

What is claimed is:

1. In a camera construction, a range finder comprising spaced obliquely positioned mirrors on top of the camera, a ring gear on the front of the camera, a pinion at the top of said camera meshing with said ring gear, a screw connected to said pinion and means actuated by said screw to move one of said mirrors, said camera being provided with a retractable cylindrical lens mount positioned inside of said ring gear, a sleeve carrying said ring gear positioned on said cylindrical lens mount and an adjustment member projecting from said sleeve and fitted into an obliquely slotted casing encircling the lens mount.

2. A camera construction comprising a retractable cylindrical lens mount, having a stop element limiting the extension thereof, a sleeve forming a bearing for and encircling said cylindrical mount, a ring gear fixed to said sleeve, a pinion actuated by said ring gear, a screw member forming a pivot mount for said pinion, a block having a threaded part to receive said screw, a sheet metal carrier provided with a pivot mount on the top of the camera construction and a down-turned lug engaging said screw, one end of said plate being up-turned to form a frame, an oblique mirror positioned in said frame and another adjustable mirror positioned on top of said camera construction to cooperate with and substantially spaced from, said first mentioned mirror to serve as a range finder.

3. In a camera construction, a casing, a reciprocable tube in said casing, a lens carried by said tube, a fixed member guiding said tube in its reciprocating movements, a frame at the inside end of said fixed member over which the film is passed for exposure, a plurality of leaf springs positioned at the inside end of said fixed member to bias said reciprocable tube forwardly and adjustable stop means to fix the forward position of said reciprocable tube and adjust the focus in accordance with the distance of the object to be photographed.

4. In a camera construction, a casing, a reciprocable tube in said casing, a lens carried by said tube, a fixed member guiding said casing in its reciprocating movements, a frame at the inside end of said fixed member over which the film is passed for exposure and a plurality of leaf springs positioned at the inside end of said fixed member to bias said reciprocable tube forwardly, the tube carrying a plurality of spaced rollers and an adjustment ring having oblique camming edges to change the position of said tube, and a range finder also cooperating with said ring.

5. In a camera construction, a casing having a front wall, having a central opening, a reciprocable tubular member extending transversely through the opening in said wall carrying a lens at its forward end, said casing having guide members guiding the reciprocating movement of said tubular member and cooperating guide members at the rear end of said tubular member to assure aligned reciprocating movement of said tubular member, a rotatable bearing ring fitted into said opening in said front wall, said ring having cam means at its rear face, contact means at the rear of said tubular member to contact said cam means upon forward movement of said tubular member, turning means to turn said ring to regulate the amount of projection of said tubular member, which projection is controlled by the place of contact of the contact means and cam means, retention means to lock the tubular member in retracted position and propulsion means to move said tubular member forwardly upon release of said retention means to cause contact between said contact means and cam means.

6. The construction of claim 5, said cam means including a plurality of wedge-like arcuate elements projecting rearwardly from the ring and said contact means including a plurality of rollers with bearing pins extending transversely outwardly from the rear of the tubular member.

7. The construction of claim 5, said retention means including a catch projecting outwardly from the ring outside of the front wall and transversely outwardly extending means on the front of the tubular member engaging said catch when the tubular member is retracted, said retention means being released upon rotation of said ring.

8. The construction of claim 5, said guide members including a transverse rectangular plate on the rear of said tubular member and a rectangular cross section guide passage in which said plate slides.

9. The construction of claim 5, the rear end of said tubular member being provided with abutments and said propulsion means including resilient means mounted in said casing pressing on said abutments.

10. The construction of claim 5, said guide members including a transverse rectangular plate on the rear of said tubular member and a rectangular cross section guide passage in which said plate slides, and a frame positioned inside of said guide passage having forwardly extending leaf springs pressing on said plate.

CHARLES LATEINER.